United States Patent [19]

Swoish et al.

[11] 4,275,431

[45] Jun. 23, 1981

[54] HIGH-VOLTAGE SINGLE-SHOT CIRCUIT-PROTECTING DEVICE WITH FUSE-LIKE CHARACTERISTICS AND HAVING A CHEMICAL OPERATING MECHANISM

[75] Inventors: Raymond F. Swoish, Murrysville; John J. Astleford, Jr., Monroeville, both of Pa.

[73] Assignee: Westinghouse Electric Corp., Pittsburgh, Pa.

[21] Appl. No.: 881,954

[22] Filed: Feb. 27, 1978

[51] Int. Cl.[3] .................... H02H 3/00; H01H 33/82; H01H 73/00

[52] U.S. Cl. .............................. 361/93; 200/144 R; 200/148 A; 361/14; 361/115

[58] Field of Search .......... 200/144 R, 144 B, 148 A, 200/82 B; 361/93, 99, 102, 115, 38, 72, 14

[56] References Cited

U.S. PATENT DOCUMENTS 3,700,970 10/1972 Miyoshi .......................... 361/102 X

*Primary Examiner*—James R. Scott

*Attorney, Agent, or Firm*—M. J. Moran

[57] ABSTRACT

An improved high-voltage, single-shot circuit-protector device, having fuse-like characteristics, and having a chemical operating mechanism, is provided to protect, at low-cost, transmission-line circuits. Preferably, the device contemplates the use of a single-pressure puffer-interrupter having a driving piston attached to the movable contact structure and operated by a chemical operator having an explosive element. Also, preferably, the aforesaid device is self-contained and self-operable, utilizing, preferably, a current-transformer, which triggers a self-contained static control circuit, the latter effecting the "firing" of the explosive element of the chemical operator to thereby generate gas pressure very quickly, and thus effect an opening operation of the contact-operating piston and the attached movable contact structure. For repetitive use, a manual reset lever is preferably provided which is capable of manual hook-stick operation. The chemical operator element is replaceable, being also capable of manual hook-stick replacement by service personnel.

8 Claims, 5 Drawing Figures

FIG. 1.
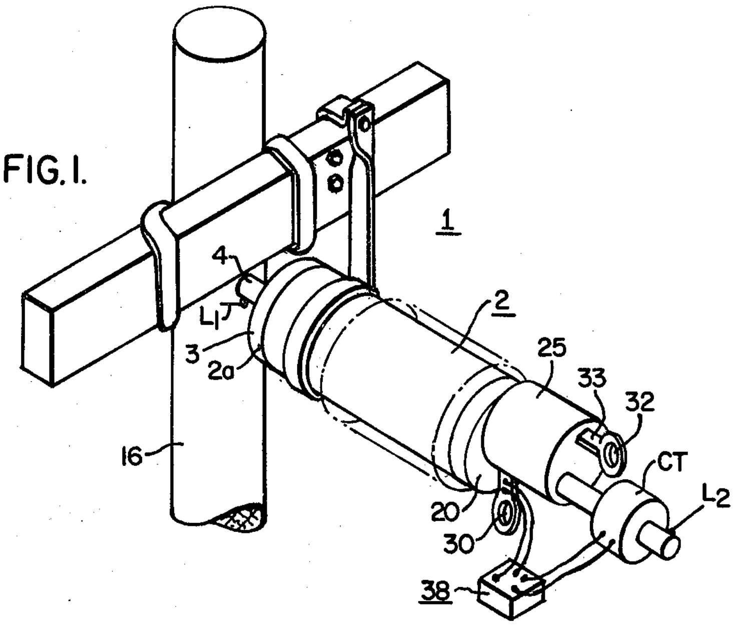
FIG. 3.
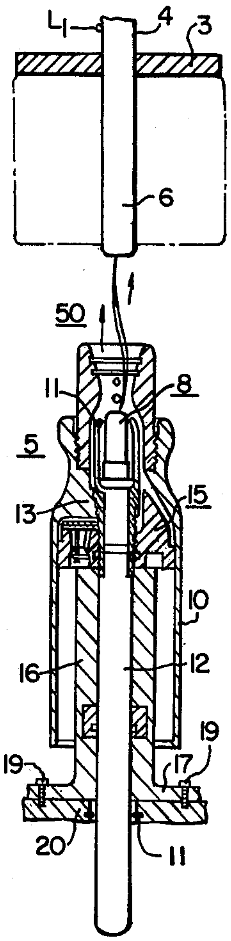
FIG. 2.
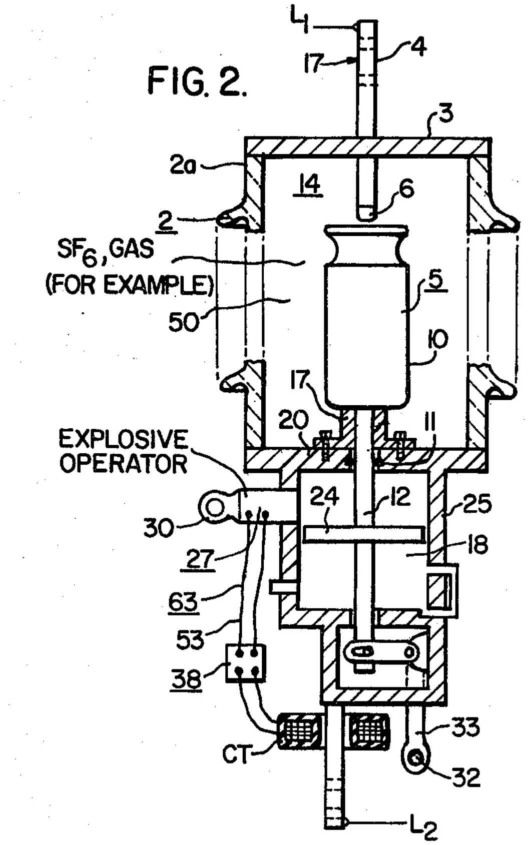
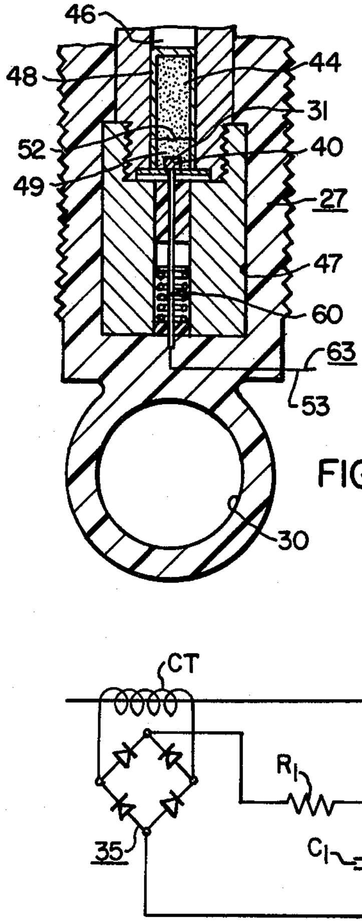
FIG. 4.
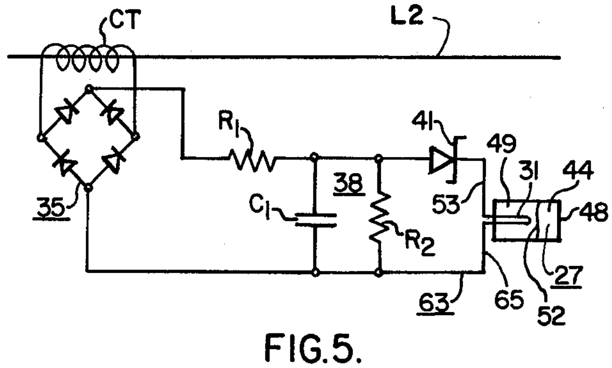
FIG. 5.

HIGH-VOLTAGE SINGLE-SHOT CIRCUIT-PROTECTING DEVICE WITH FUSE-LIKE CHARACTERISTICS AND HAVING A CHEMICAL OPERATING MECHANISM

BACKGROUND OF THE INVENTION

The present invention is particularly related to a puffer-type, compressed-gas circuit-interrupter of the single-gas-pressure-level type, being self-contained and supported up in the air by a utility pole, for example. Presently, power circuit-breakers are used at transmission voltages to protect and minimize damage to electrical apparatus used to transmit electrical energy. However, power circuit-breakers are relatively expensive and require some installation time, and, more importantly, must be periodically maintained, but do, in fact, provide a very good protective function.

As distribution-voltage protective schemes are extended upwardly to high voltages, such as sub-transmission and transmission voltages, for the purpose of reducing production system costs, and providing simpler apparatus to reduce maintenance, a need has arisen for a transmission voltage protective device, which provides a "fuse-like" "single-shot" protective function at a product cost much less than conventional power circuit-breakers.

BRIEF SUMMARY OF THE INVENTION

According to the present invention, an improved self-contained, "single-shot" protector-device, having fuselike characteristics, is provided capable of support up in the air on a utility pole, for example, and ready at all times to open the connected circuit.

Hook-stick pole operation is possible, enabling thereby the ready replacement of the explosive chemical operator, and also manually effecting, by hook-stick operation, the manual reclosure of the separate contacts.

A static control circuit is provided, as a self-contained unit, in adjunct with the self-contained circuit-protector, being energized, preferably, by a current-transformer surrounding one of the line-terminals, for example and responsive to the line current.

For quickly effecting the extinction of the arc, a "puffer" device, embodying an operating cylinder sliding over a stationary piston structure and thereby compressing gas, such as sulfur-hexafluoride ($SF_6$) gas, for example, is provided, enabling a rapid extinction to the established arc within a nozzle for directing the generated gas flow.

Reclosing may be effected by a manual crank-device operable by hook-stick operation, for example. Also, the chemical operator, which provides, or explosively generates gas pressure to effect operation of the driving piston, may also be replaceable, as a separate replaceable cartridge unit, also, preferably, by manual hook-stick operation.

BRIEF DESCRIPTION OF THE DRAWINGS

FIG. 1 is a diagrammatic perspective view of the self-contained protector-device of the present invention being shown supported at the upper end of an upstanding utility pole, being self-contained and self-sufficient in its fuse-like operation;

FIG. 2 is a vertical sectional view taken longitudinally through the single-shot, puffer-type circuit-protector device of FIG. 1, with the contacts being shown at an intermediate point in the opening operation;

FIG. 3 is a somewhat enlarged view of the separable contact structure and the associated piston-and-cylinder gas-generating device utilized in the sulfur-hexafluoride puffer unit of FIG. 1, again the arcing condition being illustrated;

FIG. 4 is an enlarged sectional view taken through the cartridge-like explosive element; and, FIG. 5 is a somewhat diagrammatic view of the static control circuit for the ignition, or "firing" of the explosive element of the chemical operator for sudden gas generation.

DESCRIPTION OF THE PREFERRED EMBODIMENT

Referring to the drawings, and more particularly to FIGS. 1–3 thereof, it will be observed that there is provided a puffer-type, compressed-gas circuit-interrupter system 1 having an insulating casing structure 2, which is provided at one end 2*a* thereof, with a metallic closure cap 3 having a rod-like line-terminal connection 4 fixedly secured thereto. The inner extremity of the line-terminal connection 4 forms the rod-like stationary contact 6 of the device.

Cooperable with the stationary contact 6 is a movable contact structure 8, more clearly illustrated in FIG. 3, and having affixed thereto, and movable therewith, an operating cylinder 10 and a main movable auxiliary finger-like contact structure 11 surrounding the movable rod contact 8. An operating rod 12, having a spider-support 13 to the movable operating cylinder 10, effects the leftward closing and the rightward opening movements of the movable contact structure 8 and operating cylinder 10 over a relatively-stationary piston structure 15, the latter being supported fixedly in place by a stationary metallic support pedestal 16 having a supporting flange 17 disposed at its right-hand extremity, as shown more clearly in FIG. 3.

The supporting flange 17 of the stationary piston 15 is affixed, as by mounting bolts 19, to the right-hand metallic closure plate 20 of the protector-unit 5, and extends through the right-hand metallic closure plate 20, being affixed externally of the interrupting unit 1 to an operating driving piston 24, reciprocally operable within a surrounding stationary operating cylinder 25.

The puffer interrupter 5 is connected to the operator drive-piston 24 by a connecting shaft 12, which passes through a shaft seal 11, that separates the $SF_6$ gas chamber 14 from the operator cylinder chamber 18. The operating shaft 12 extends through the operating piston 24 to a lever 33, which, as mentioned, provides manual reclosing of the contacts of the puffer-interrupter 5 after an opening operation.

Preferably, a chemical operator 27 of the generally cartridge type, the details of which are set forth in FIGS. 2 and 4, is removably positioned toward the left-hand end of the operating cylinder 25, and is capable of replacement by a hook-stick operation, an eyelet 30 being provided at the lower end of the chemical operator 27, as illustrated in FIG. 4.

The chemical operator 27 is "fired" by the ignition of a primer 31 constituting a part of the cartridge-like chemical operator 27, and also illustrated more clearly in FIG. 4 of the drawings.

A current-transformer "CT" encircles the right-hand rod-like line-terminal $L_2$ and generates power to a storage capacitor $C_1$, as more clearly illustrated in FIG. 5, by a rectification circuit 35, converting the alternating current output of the current-transformer "CT" to a direct current, which is fed to a time-voltage shaping network 38, typically shown by the circuit components of $R_1$, $R_2$ and $C_1$. This voltage, stored within the storage capacitance $C_1$, is switched by a trigger diode 41 (such as a SCR or avalanche diode) to electrically heat a firing wire 40 embedded in the chemical propellant 44.

The arrangement of the shaping network 38 and the control switch 41 can be varied to obtain the desired time-current operating characteristics for the single-shot circuit-protector system 1.

FIG. 5 illustrates in more detail an electrical circuit which may be utilized to initiate electrical firing of the primer 31 associated with the shotgun-shell type of propellant cartridge 27. The driving power-piston 24 is actuated toward the right, in a circuit-opening direction, as viewed in FIG. 2, by the propellant charge cartridge 27. This propellant cartridge 27, which is useable in a replaceable manner, is a so-called "shotgun" gas generator.

In accordance with one aspect of this invention, the generator means 27 is a gas generator of the "shotgun" type, comprising a barrel 46 and a receiver, or chamber 47. Within the cartridge casing 48 there is a propellant charge 44 of solid explosive material, a charge 49 of igniter material and a primer 31. The igniter material insures fast and efficient combustion of the main propellant charge 44. Depending upon the particular application, it may not be required. The propellant charge 44 of a combustible material comprises a flammable material, which, upon ignition, burns and generates gas at high pressure to drive the piston 24 from the closed-circuit position, illustrated in FIG. 2, to the open-circuit position, as illustrated in FIG. 3. An example of the propellant charge 44 is a double-base smokeless gunpowder, although it is by no means limited to this. The gas may develop a pressure of from about 3,000 to 10,000 p.s.i. or higher, within the operating cylinder 25 for driving the movable piston 24 rightwardly in the circuitbreaker opening direction.

The igniter charge 49 is preferably separated at a position 52 from the propellant charge 44, and is a solid charge which produces a ready flame for igniting the propellant charge 44. The igniter charge 49 is an easily ignited material, such as black powder, a mixture of amorphous boron powder and potassium nitrate, or other suitable compound.

The primer 31 is electrically sensitive to a low-level signal or electrical pulse supplied by the ignition line 53, which leads from the trigger diode 41 (FIG. 5) for detecting an overcurrent, or fault condition in the controlled circuit $L_1$–$L_2$ passing through the separable contacts 6, 8. Primers 31 may be purchased from the Olin Company, Winchester-Western Division, located at New Haven, Connecticut and at East Alton, Illinois. According to their specification sheet, primer time is, for example, 0.300 milliseconds maximum. The primer 31 is preferably composed of an electrically-sensitive flammable mixture, such as lead styphnate and acetylene black, which ignites, when activated by an electrical charge, to produce a small flame to ignite the igniter charge 49, which, in turn, produces a flame for igniting the propellant charge 44.

In summary, when the electrical pulse triggers the firing circuit of the primer 31, the primer 31 is actuated promptly to ignite the igniter charge 49, which, in turn, ignites the main propellant charge 44. The gas generated by the propellant charge drives the driving piston 24 through its opening power stroke, that is carrying the movable contact 8 toward the right, as viewed in FIGS. 2 and 3.

Preferably, the firing pin 60 is biased constantly against the primer 31 of the cartridge 27 and the tripping occurs electrically, as indicated in FIG. 5. Thus, in order to trip the circuit-breaker 5 open, and to ignite the primer 31, an electrical circuit 63 (FIG. 5) is completed through the firing pin 60, primer 31 of the cartridge 27, which is then inserted in the firing chamber 46 an thence to the other side 65 of the control circuit 63.

Both the chemical operator 27 and the manual reset lever 33 are provided with hookeyes 30, 32 for manual hookstick operation from ground, or from a truck bucket maintenance device (not shown).

From the foregoing description, it will be apparent that there has been provided a simple, single-pressure, puffer-interrupter 5 in combination with an operating mechanism 24 powered by a gas-producing chemical operator 27, which is fired by a self-contained static control circuit 38, all of these component elements being mounted, as shown, at high-voltage potential at the upper end of a line utility pole 16.

The result of the invention is an improved arrangement to provide a self-contained system 1 completely installed at the high-voltage potential, which provides an economical fuse-like protection characteristic for transmission-voltage levels. The insulating porcelain container 2 may, preferably, contain sulfur-hexafluoride ($SF_6$) gas 50, for example, at a pressure of say, for example, 3 to 4 atmospheres, which medium surrounds the puffer interrupter element 5.

Although there has been illustrated and described a specific structure, it is to be clearly understood that the same was merely for the purpose of illustration, and that changes and modifications may readily be made therein by those skilled in the art, without departing from the spirit and scope of the invention.

We claim as our invention:

1. A circuit-protector device, comprising
(a) circuit breaker means providing an insulating gas-sealed casing structure having separable circuit contacts disposed therewithin, one of which is movable;
(b) gas-pressure generating means disposed within said sealed casing and associated with said separable circuit contacts and moreover actuated by the opening movement of said movable contact to extinguish the established arc;
(c) operating means for effecting the opening and closing movements of said movable contact including a movable driving piston reciprocally operable within a relatively-stationary operating cylinder and mechanically interconnected with the said movable contact;
(d) means defining a chemical operator element functioning to generate gas pressure on one side of said movable driving piston to effect thereby opening movement of the separable contacts and also to actuate said gas-pressure generating means for arc-extinguishing purposes; and
(e) means defining a current-responsive sensitive device sensitive to the magnitude of the controlled circuit passing through the circuit-protector for firing said chemical operator and thereby effecting opening movement of the movable contact.

2. The combination according to claim 1, wherein a manual reset lever is mechanically linked to the movable driving piston for manually effecting the closing of the separable contacts by hook-stick operation.

3. The combination according to claim 2, wherein the chemical operator is a replaceable cartridge.

4. The combination according to claim 1, wherein a static control circuit is provided to effect ignition and firing of the chemical operator being energized by said current-responsive device.

5. The combination according to claim 4, wherein a rectifying circuit is provided in conjunction with a current transformer for effecting charging of a storage capacitance, and a trigger diode is provided to electrically fire the chemical operator when triggered by excessive current in the controlled circuit.

6. A circuit-protector, comprising:

(a) means defining a generally-cylindrical insulating casing;

(b) means defining a generally-cylindrical operating mechanism casing generally constituting an extension of the aforesaid insulating casing and disposed generally on the same axis thereof;

(c) a pair of separable contacts disposed within said cylindrical insulating casing, one of which is a movable contact;

(d) an operating rod extending through one end of the insulating casing and being affixed to the movable contact at one end and a driving piston at the other end thereof, with the driving piston reciprocally operable within said extended cylindrical operating cylinder;

(e) an operating cylinder and a hollow insulating nozzle through which the established arc is drawn being disposed upon said movable contact;

(f) a stationary piston structure supported by one closure end of said insulating cylindrical casing and having said movable operating cylinder slidable thereover;

(g) said operating rod having an extension protruding through one end of said cylindrical operating cylinder;

(h) a generally bell-crank-type manual reset lever pivotally connected to said extension of the operating rod and capable of hook-stick operation;

(i) an explosive cartridge removably disposed within a side wall of said cylindrical operating mechanism casing and capable of replacement by hook-stick operation;

(j) a current-transformer disposed adjacent said manual reset lever and sensitive to the magnitude of the current passing through the controlled circuit;

(k) a static control element energized by the current-transformer and functioning to ignite the explosive material within said explosive cartridge; and (l) means supporting said self-contained protector unit at an adequate distance and height from ground potential.

7. The combination according to claim 6, wherein an extension of the stationary contact rod comprises a first line-terminal connection, and a rod-like extension protrudes from the manual reset lever housing in the opposite direction and comprises a second line-terminal.

8. The combination according to claim 6, wherein the static control circuit comprises a storage capacitor ($C_1$) and a resistance network ($R_1$, $R_2$) together with a rectifier connected to the current transformer to effect thereby a storage of energy within the storage capacitor ($C_1$), and a trigger diode in series circuit with a primer and both such elements being in parallel with the storage capacitor ($C_1$) so that upon triggering by the trigger diode, due to excessive current, the primer will be ignited and thereby explode the explosive material within the explosive cartridge generating gas pressure and effecting an opening operation of the puffer-type interrupter.

* * * * *